(No Model.)
H. P. WELLS.
CARRIAGE.
No. 449,841. Patented Apr. 7, 1891.
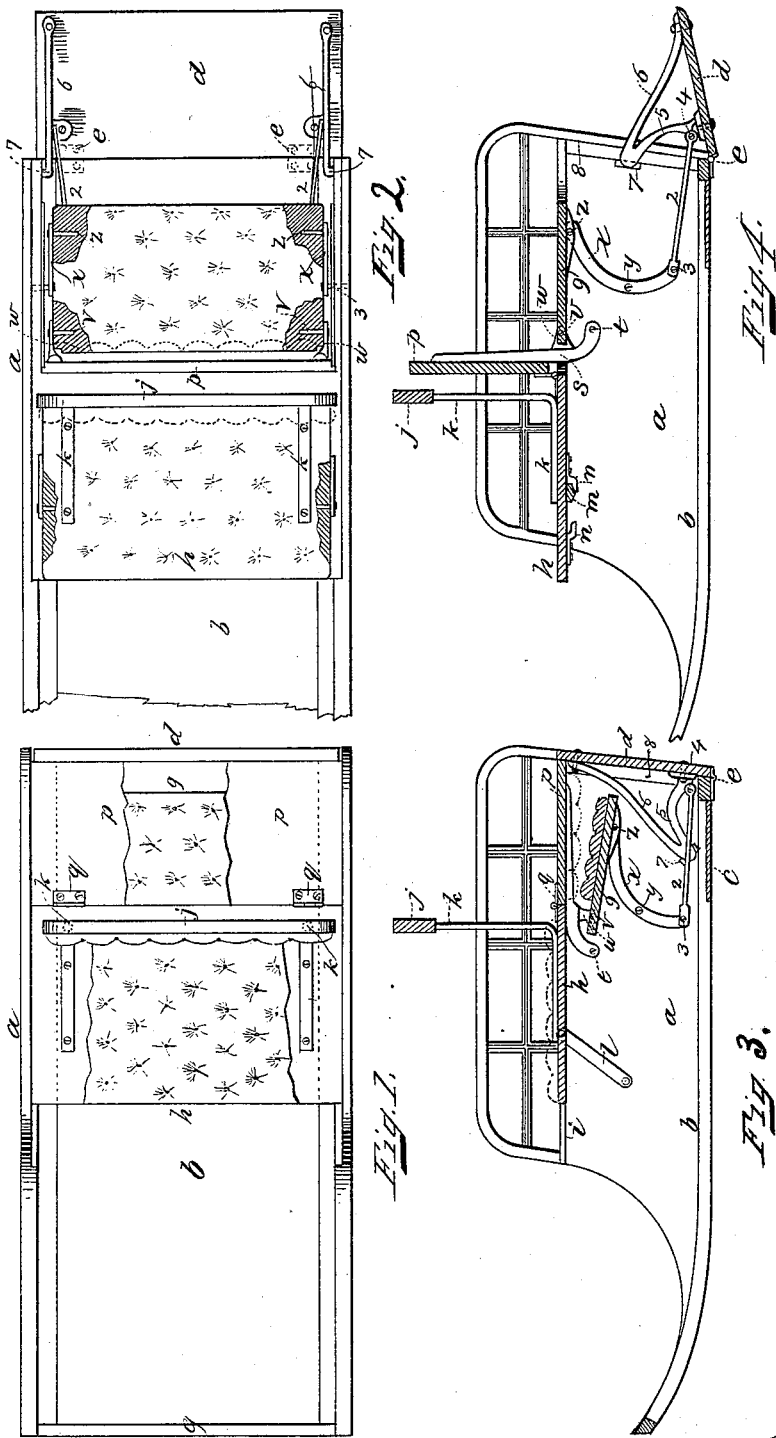
Witnesses:
A. L. Rich
E. K. Hendum
Inventor
Harlan P. Wells
per T. W. Porter, Atty.

UNITED STATES PATENT OFFICE.

HARLAN P. WELLS, OF AMESBURY, MASSACHUSETTS.

CARRIAGE.

SPECIFICATION forming part of Letters Patent No. 449,841, dated April 7, 1891.

Application filed August 30, 1890. Serial No. 363,550. (No model.)

*To all whom it may concern:*

Be it known that I, HARLAN P. WELLS, of Amesbury, in the county of Essex and State of Massachusetts, have invented a new and useful Improvement in Carriages, which will, in connection with the accompanying drawings, be hereinafter fully described, and specifically defined in the appended claims.

Figure 1 is a top plan view of a vehicle-body embodying my invention and shown as adjusted for use with one seat. Fig. 2 is a view similar to Fig. 1, but as adjusted for use with two seats. Fig. 3 is a sectional elevation, the section being vertical and longitudinal and the elevation as viewed from the left-hand side ("near" side) of the vehicle, the respective parts being shown in the same relative positions as in Fig. 1. Fig. 4 is a view similar to Fig. 3, but with the respective parts shown in the same relative positions as in Fig. 2.

This invention relates to that class of carriages which are readily adjusted for use with either one or two seats, as may be desired; and it consists in features of novelty which will, in connection with the drawings, be next herein fully described, and embodied in the claims.

Referring again to said drawings, $a$ represents the side of a carriage-body of suitable form with which to embody my invention, but which may be varied as taste, inclination, or style may prompt. Side sills $b$, floor $c$, rear cross-sill $f$, and front sill $g$ are of usual kind. A sliding or jumping front seat $h$ rests upon ledges $i$, and is secured at its front edge by a jumping-iron $l$, which in a usual manner is at its lower end pivoted to the body and at its upper end to the seat; but instead of said iron $l$ a transverse bar $m$ may extend across the body, while two lock-down hooks $n$ are secured beneath the seat in such position that whether advanced or moved to rear one of said hooks locks the seat securely to the bar, the same and iron $l$ being well-known equivalents. Said front seat is provided with back standards $k$, to which a back $j$ is secured; but said back may be varied in width or method of attachment, as desired. A deck-panel $p$ is attached to front seat $h$ by hinges $q$, said panel having attached to it near its ends the irons $s$, pivoted at their lower ends to sides $a$, and having a short arm $w$ pivoted to a rear seat $q$ at $v$.

A jumping-iron $x$, pivoted to the body at $y$, has its upper end pivoted at $z$ to seat $q$, while its lower end is pivoted at 3 to connecting-rod 2, having its rear end pivoted at 4 to iron 5, secured to tail-board $d$, which is pivoted at $e$ to the body. Said iron 5 has a branch 6, that serves as a side rail or guard when the tail-board is open, as shown in Figs. 2 and 4, and at the inner end of said iron is formed a lip 7, that engages the corner-piece 8 of the body to thereby sustain the tail-board when opened, as shown in Figs. 2 and 4.

In practical operation, when the tail-board is closed, as in Figs. 1 and 3, the front seat is in its rearmost position and deck-panel $p$ is in its lowered position, inclosing all the body-space from the rear edge of seat $h$ to the tail-board, while rear seat $q$ is beneath the deck-panel, as in Figs. 1 and 3; but by the act of opening the tail-board jumping-iron $x$ moves rear seat 9 forward and upward, and by its connection with iron $s$ raises the deck-panel to serve as the back of seat 9, and also jumps front seat $h$ forward, all as shown in Figs. 2 and 4.

In Fig. 4 the cushions are omitted the better to show the operative parts, and in Figs. 1 and 3 portions of the cushions are broken away for the same reason.

It is obvious from an inspection of the drawings that by pivoting the deck-panel $p$ direct to the front seat $h$, and also pivoting the irons $s$ to the rear seat 9, the back of the rear seat (the deck-panel when the seat is not in use) is hinged to both seats, as at $q$ and at $v$. It will be obvious to any one skilled in this art that various changes in details of construction of parts may be made without departing from the spirit of my invention, and hence I do not confine myself thereto.

I claim as my invention—

1. In a two-seated carriage, the combination of a front seat, a rearward-facing rear seat, and an adjustable back for said rearward-facing seat, arranged to constitute a deck-panel when lowered upon the rear seat, substantially as specified.

2. The combination of a seat constructed to be raised and lowered, a deck-panel arranged to be raised to serve as the back of said seat when in position for use, and a hinged tail-board connected with said seat and panel, whereby the opening and closing of the tail-board will actuate the seat and will raise and lower said panel, in the manner and for the purposes specified.

3. The combination of a front jumping or sliding seat, a rear adjustable seat, and a rising and falling back hinged to both said seats.

4. The combination of the deck-panel, the rear seat and the arm secured to the deck-panel, extended below the deck, and pivoted to both the body and the rear seat.

5. The combination of a front seat adjustable at will fore and aft in the carriage, a deck-panel hinged to said seat, and a rear seat vertically adjustable to coact with said panel in forming a seat and its back.

6. The combination of the adjustable front seat provided with a standing back, the movable deck-panel hinged to the front seat, the arm of the panel pivoted to the body and to the rear seat, the jumping-iron pivoted to the body and rear seat, and the hinged tail-board connected with said jumping-iron.

HARLAN P. WELLS.

Witnesses:
FRANK R. WHITCHER,
ORLANDO S. BALEY.